United States Patent Office 3,559,382
Patented Feb. 2, 1971

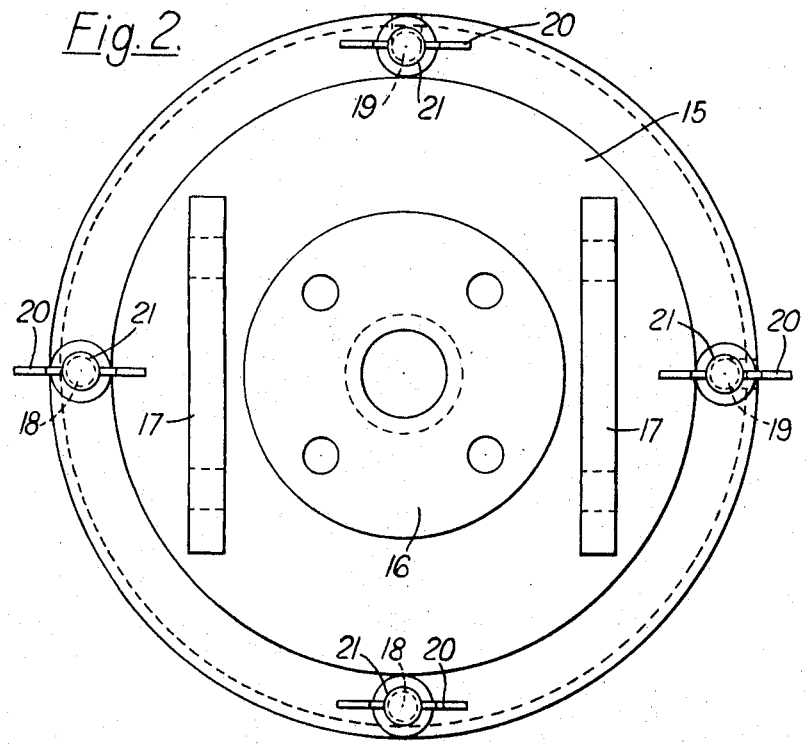
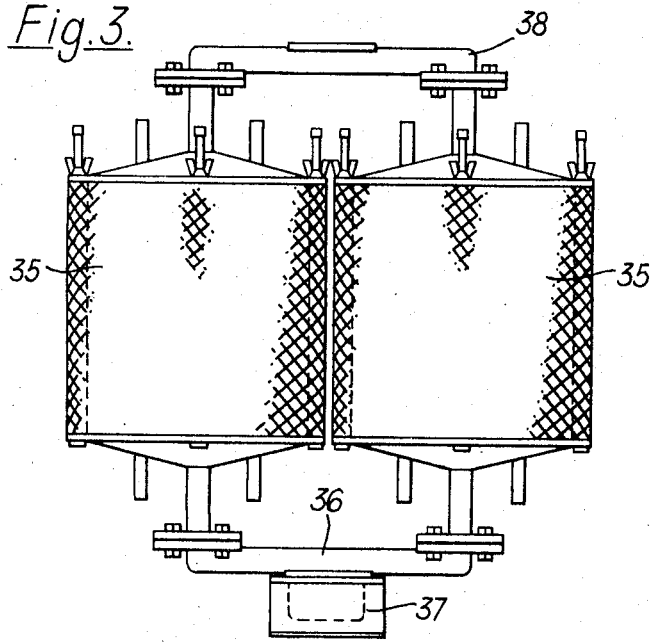

3,559,382
DESICCANT BREATHER FOR ELECTRICAL TRANSFORMERS, REACTORS AND ASSOCIATED EQUIPMENT
Peter Charles Jaggard, Wraysburg, Buckinghamshire, and Graham George Hooper, Ashford, Middlesex, England, assignors to W. R. Grace & Co.
Filed Apr. 10, 1968, Ser. No. 720,157
Claims priority, application Great Britain, Apr. 19, 1967, 18,082/67
Int. Cl. B01d 53/04
U.S. Cl. 55—274          3 Claims

ABSTRACT OF THE DISCLOSURE

An apparatus for drying gases passing into or out of an otherwise closed chamber. Said apparatus comprises a transparent container for desiccant, a means to control the admission of atmospheric air into the desiccant container, and a releasable means for easily removing the desiccant from its container.

---

The invention relates to an apparatus for drying gases. More particularly, this invention relates to an apparatus that permits easy removal of the desiccant charge, and that excludes atmospheric gas from being in constant contact with the desiccant.

As is well known, there are many situations which exist which require anhydrous gas. Typical of such a system is an oil cooled electrical transformer. A transformer of this type is provided with an oil reservoir chamber to allow for expansion and contraction of the coolant (oil) as the transformer's temperature varies during its use. A vent pipe connects the reservoir chamber to the atmosphere, and it is usual to pass air through a body of desiccant such as silica gel to dry it before it enters the reservoir chamber. In order to prevent the desiccant from quickly becoming moisture-laden, means have to be provided for preventing atmospheric air from contacting the desiccant except when the transformer is "breathing", i.e., intake or exhaust of air through the vent pipe. Thus, a typical breather for an oil cooled transformer consists essentially of a vessel which in use contains a desiccant and a second vessel adapted to provide a seal when charged with liquid. Such a breather is normally connected to the open end of a downwardly hanging vent pipe.

It is to be understood that the use of the instant invention in conjunction with an oil cooled transformer is merely illustrative and that our invention can be used with any system requiring intermittent intake and exhaust of gas.

It is therefore an object of this invention to provide a gas drying "breather" apparatus for use in systems which require intermittent intake and exhaust of gas.

It is another object to provide a gas drying "breather" apparatus which permits easy removal of the desiccant vessel.

A further object is to provide a gas drying "breather" apparatus which permits the atmosphere to contact the desiccant only upon demand of the system served by said apparatus.

A further object of this invention is to provide a gas drying "breather" apparatus which permits visual observation of the desiccant charge.

These and other objects of the present invention will appear obvious from the drawings and the following detailed description.

A preferred embodiment of this invention is illustrated in the accompanying drawings in which:

FIG. 2 is a plan view of the breather shown in FIG. 1; and

FIG. 3 is a front elevation of another form of breather arrangement.

Figure 1:
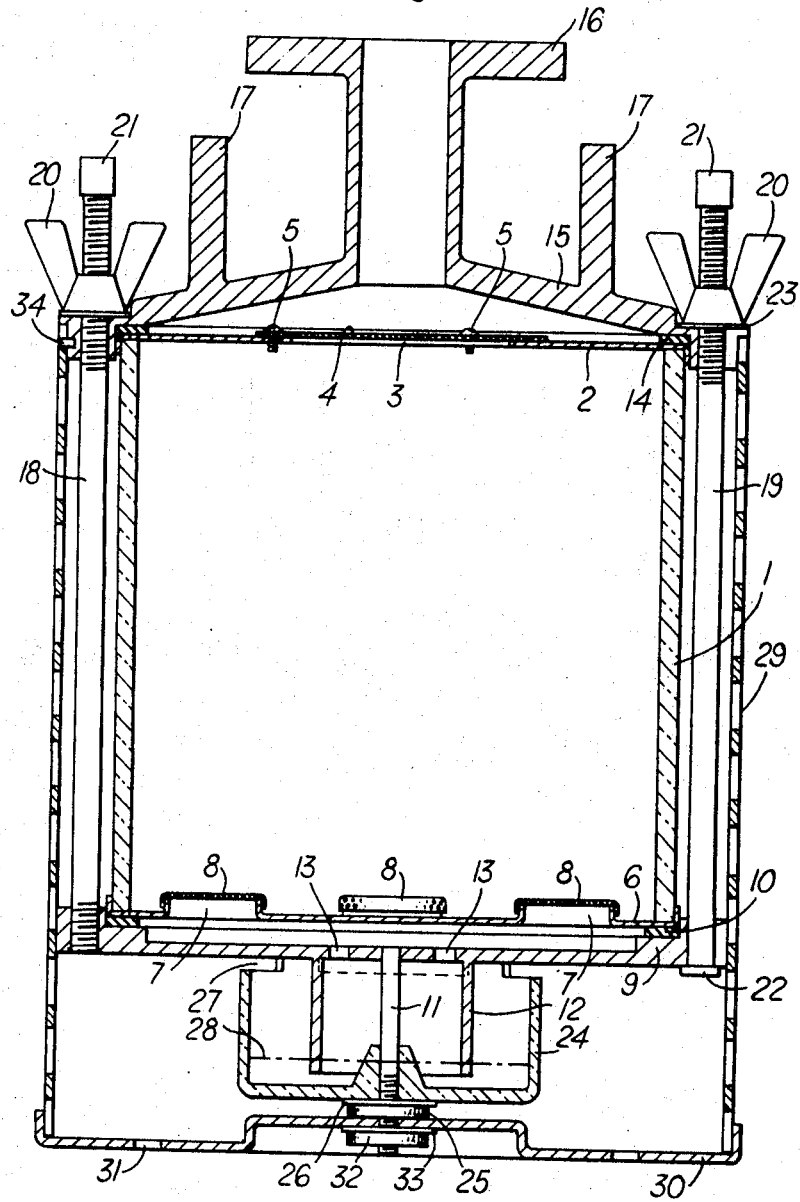
FIG. 1 is a vertical cross-sectional view of one form of breather.

Referring to FIGS. 1 and 2 there is shown a glass cylinder 1, at one end of which there is a dished plate 2 of aluminium. The dished plate 2 has a centrally situated circular aperture 3 which is covered by a perforated screen 4. The screen 4 is attached to the plate 2 by means of screws 5. A second dish shaped plate 6 is arranged at the other end of the cylinder 1. The plates 2 and 6 are bonded to the cylinder 1 by means of a synthetic resin glue. There are provided four holes 7 in the plate 6 and the edges of the plate around the holes are truned inwardly in order to provide location for perforated screens 8 covering each of the holes. The cylinder 1 is located at its other end in a supporting plate 9 and an annular gasket 10 is arranged between the supporting plate 9 and the cylinder 1. A threaded centre stud 11, made from aluminium, extends outwardly from the mounting plate 9. A tubular baffle portion 12, coaxial with the stud 11, also extends outwardly from the supporting plate 9. Four circular holes 13 are drilled in the supporting plate 9 between the centre stud and the tubular portion 12. In the outer edge of the tubular portion 12 there are a number of serrations which are not visible in the drawing. The one end of the cylinder 1 is located in a supporting plate 15 which is provided with a central tubular portion extending outwardly from the plate and having a flange 16. A gasket 14 is arranged between the dished plate 2 and the supporting plate 15. Two lugs 17 extend from the supporting plate 15 and these may be used for supporting the whole assembly from brackets. The flange 16 is provided for bolting the assembly to a similar flange on a vent pipe from a transformer.

The assembly consisting of the cylinder 1, the dished plates 2 and 6, and the supporting plates 9 and 15 is clamped together by means of two rods 18 and two rods 19 each having a screw threaded end which extends through the mounting plate 15 and upon which there is threaded a wing nut 20. The end of each of the rods is provided with a collar 21 to prevent its associated wing nut 20 from being inadvertently removed from the rod. The rods 18 extend through holes in the supporting plate 15 and the rods 19 extend through slots in the edge of the plate 15. The ends of the rods 18 opposite to the ends extending through the supporting plate 15 are threaded and are screwed into the supporting plate 9. The ends of the rods 19 opposite to those extending through the supporting plate 15 are provided with heads 22 and the rods 19 are located in slots in the edge of the supporting plate 9 and are prevented, by the presence of the head 22, from being drawn through these slots when the wing nuts 20 are tightened. It is thus possible to unscrew the wing nuts 20 and to loosen or release the whole assembly. The rods 19 may be withdrawn from the assembly by removing them from the slots in the edges of the plates without dismantling the assembly.

The rods 18, however, are secured to the plate 9 and remain so attached to the plate 15, even when released by unscrewing the wing nuts 20 sufficiently to enable the container 1 to be removed, that the supporting plates 9 and 15 remain held together. A washer 23 is provided between each of the wing nuts 20 and the supporting plate 15.

The tubular portion 12 extending outwardly from the supporting plate 9 is surrounded by a cup 24 made of glass which is held in position against the supporting plate 9 by means of a nut 25 screwed on to the threaded portion of the stud 11 which passes through a central hole in the glass cup 24. A washer 26 is arranged between the nut 25 and the cup 24. The rim of the cup 24 adjacent the supporting plate 9 may have four scalloped portions 27 through which it is possible for air to enter the cup. A line 28 indicates the level to which oil should be kept within the cup during the operation of the device. It will be noticed that the tubular baffle portion 12 extends just below the level of the oil.

Around the whole assembly there is a cylindrical guard 29 which is made of expanded metal and is located at one end on a stud 34 extending from the edge of the supporting plate 15. The stud 34 prevents the guard 29 from rotating independently of the plate 15. At the other end of the guard 29 there is a dished portion 30 having drain holes 31 and a central hole which locates on the stud 11, on which it is held by means of a nut 32 and a washer 33.

In operation the assembly is bolted to the vent pipe of a transformer by means of the flange 16, the cylinder 1 is filled with a desiccant which is of the type which changes colour when its replacement becomes necessary and oil is introduced into the cup 24 up to the level indicated by the line 28. The whole assembly is fitted together in the way previously described and when the transformer breathes, due to a change of temperature causing a contraction or an expansion of oil in the transformer, air may either pass out of or into the transformer through the path including the vent pipe, the tubular extension from the mounting plate 15, the desiccant in the cylinder 1, the perforated screens 8, the holes 13, the oil in the cup 24 via the space formed between the end of the tubular portion 12 and the bottom of the cup and the scalloped spaces provided by the scalloped portions 27 to or from the atmosphere.

The valve provided by the tubular portion 12 extending into the oil in the cup 24 acts as a pressure sensitive two way valve and prevents atmospheric air other than that necessary for breathing from coming into contact with the desiccant in the cylinder 1. Thus the desiccant, which is normally silica gel, is only contacted by air which is actually breathed into or out of the transformer.

When the desiccant changes colour and its replacement becomes necessary the colour change is visible through the transparent container 1. The assembly may then be released, to enable the desiccant to be changed, in the following manner. The guard 29 may be removed by unscrewing the nut 32 and the assembly released by loosening the wing nuts 20. Either one or both of the rods 19 may be removed from the loosened assembly, since they may be lifted out of the slots in the edges of the supporting plates 9 and 15. The cylinder 1, complete with dished end plates 2 and 6, may then be removed from the assembly, while the supporting plates 9 and 15 are still held together by the rods 18, which are secured at one end to the supporting plate 9 by the threaded portions of the rods in engagement with the plate 9, and are attached at the other end to the supporting plate 15.

The cylinder 1 may then be recharged by unscrewing the screws 5 and removing the screen 4 so that the desiccant may be emptied from the cylinder 1 and replaced. The screen 4 may then be put back and the cylinder 1 may be replaced in the assembly. Alternatively a replacement cylinder with fresh desiccant may be introduced into the assembly. The rod or rods 19 may be put back into position and the assembly may be clamped together by means of the rods and the wing nuts 20.

The cylinder 1 may be recharged by unscrewing the screws 5 and removing the perforated screen 4.

The cup 24 may also be removed for cleaning or recharging when the guard 29 has been removed by unscrewing the nut 25 while the main assembly remains held together by the rods 18 and 19.

It is, of course, possible for there to be only two clamping members and for these to be provided by two rods 18 on diametrically opposite sides of the assembly.

There may thus be provided an assembly, the main parts of which are positively held together so that there is little possibility of parts coming away from the assembly while the desiccant is changed.

Although in the particular embodiment described the assembly is bolted to the vent pipe of a transformer by means of a flange portion, other methods of fixing may of course be used. For example a threaded connection may be provided between the extension on the plate 15 and the vent pipe. Flat surfaces on the extension piece may be engaged by a spanner to tighten the assembly on the vent pipe.

Furthermore, on assemblies which are comparatively light in weight it may not be necessary to provide the lugs 17 by means of which the assembly can be supported on a bracket independently of the vent pipe. In such lightweight constructions the assembly may be supported by the vent pipe alone.

Referring to FIG. 3 there is shown an arrangement in which two breather assemblies 35 are coupled on their atmosphere side by a manifold 36 to an oil seal valve 37 of the type described above. The other end of each of these assemblies is also coupled together by a manifold 38, by means of which they may be connected to the vent pipe of a transformer.

Although in the arrangements described the desiccant cylinders have been shown arranged vertically, there is no reason why they should not be arranged differently, for example horizontally, provided that where an oil seal valve is used this valve is positioned if necessary by making the connection to the desiccant container through an elbow. The valve may be constituted by a known two way value, for example a pair of mechanical flap valves so arranged and connected back-to-back that a pressure sensitive two way valve is obtained.

The desiccant container need not be cylindrical and where there is no requirement that the desiccant be visible it may be opaque. The guard 39 may be of a plastics or a plastics coated metal material.

We claim:

1. A gas drying apparatus comprising:

an elongated, cylindrical, transparent desiccant container having an open upper end and an open lower end, said upper end being removably fitted with a perforated upper end desiccant retaining means and said lower end being firmly fitted with a perforated lower end desiccant retaining means; an upper desiccant container cover, said upper cover being removably affixed to the upper end of the desiccant container and said cover being provided with a centrally located gas passage orifice and attachment means; and a lower desiccant container cover, said lower cover being removably affixed to the lower end of the desiccant cover, said lower cover being removably affixed to the lower end of the desiccant container;

a normally closed gas intake and exhaust means wherein said intake and exhaust means comprises an outer member and an inner member, said outer member comprising a cylindrical cup shaped fluid container, said container being perforated at its edge to permit intake and exhaust of a gas, and being partially filled with a gas partitioning fluid, said outer member being removably affixed to the underside of the aforementioned lower desiccant container cover, and said inner member being a downwardly projecting cylindrical wall having its lower end immersed in the aforementioned gas partitioning fluid and its upper end affixed to the under side of the lower desiccant container cover, thus forming an inner chamber, said inner chamber communicating with the desiccant chamber by means of openings in the lower desiccant container cover, said openings being situated within the periphery of the top of said downwardly projecting cylindrical wall; and a guard comprising an elongated cylindrical member and a lower cover plate, the cylindrical member being perforated to allow visual observation of the aforementioned transparent desiccant container and having an upper end and a lower end; said upper end resting against a flange which extends circumferentially outwardly from the aforementioned upper desiccant container cover, and said lower end being affixed to said lower cover plate; said guard being affixed to said apparatus by means of a guard retaining nut working on the aforementioned threaded stud.

2. The apparatus of claim 1 wherein said normally closed intake and exhaust means is removably affixed to the underside of said lower desiccant container cover by means of a retaining nut working upon a threaded stud which projects vertically downwards from the center of said lower desiccant container cover, said stud being affixed thereto.

3. The apparatus of claim 1, said apparatus being provided with a circular baffle plate, said plate being positioned above the lower desiccant container cover and below the perforated lower end desiccant retaining means, and said plate being affixed at its center to an extension of the aforementioned threaded stud.

References Cited

UNITED STATES PATENTS

| | | | |
|---|---|---|---|
| 1,100,736 | 6/1914 | Hundt | 174—14 |
| 1,759,971 | 5/1930 | Austin | 55—388 |
| 2,325,657 | 8/1943 | Burkness | 55—274 |
| 2,614,650 | 10/1952 | Chandler et al. | 55—275 |

SAMIN N. ZAHARNA, Primary Examiner

C. N. HART, Assistant Examiner

U.S. Cl. X.R.

55—387; 174—14